US012664134B1

(12) United States Patent (10) Patent No.: US 12,664,134 B1

Ravi et al. (45) Date of Patent: Jun. 23, 2026

(54) CLOUD-BASED TESTING AND IMPROVEMENT OF DATA QUALITY FOR MACHINES AT A CLIENT SITE

(71) Applicant: Amazon Technologies, Inc., Seattle, WA (US)

(72) Inventors: Aarthi Ravi, San Jose, CA (US); Mihir Kumar Choudhary, Morgan Hill, CA (US); Sharad Singh, Fremont, CA (US); Kai Fan Tang, Port Coquitlam (CA); Valery Yalauchuk, London (GB); Stephen Haines, Danville, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/902,483

(22) Filed: Sep. 30, 2024

(51) Int. Cl.
G06F 16/215 (2019.01)
(52) U.S. Cl.
CPC ................................. G06F 16/215 (2019.01)
(58) Field of Classification Search
CPC .................................................. G06F 16/215
See application file for complete search history.

(56) References Cited

U.S. PATENT DOCUMENTS

| | | | |
|---|---|---|---|
| 11,048,498 B2 | 6/2021 | Malladi | |
| 11,388,195 B1 * | 7/2022 | McCaffery | .......... H04L 63/1425 |
| 2013/0290374 A1 | 10/2013 | Chand | |
| 2017/0242935 A1 | 8/2017 | Wragg | |

| | | | |
|---|---|---|---|
| 2018/0284755 A1 | 10/2018 | Cella | |
| 2019/0109713 A1 * | 4/2019 | Clark | .................... G06F 16/182 |
| 2020/0201875 A1 | 6/2020 | Wu | |
| 2021/0241865 A1 * | 8/2021 | Bhattacharya | .......... G06F 30/20 |
| 2022/0171891 A1 | 6/2022 | Sinha | |
| 2022/0222242 A1 * | 7/2022 | Spranger | .................. G06N 3/02 |
| 2022/0300502 A1 | 9/2022 | Enver | |
| 2023/0394329 A1 | 12/2023 | Rummele | |
| 2023/0421615 A1 | 12/2023 | Visoky | |
| 2024/0012395 A1 | 1/2024 | Winkler | |

(Continued)

FOREIGN PATENT DOCUMENTS

| | | | |
|---|---|---|---|
| CN | 108199897 | 6/2018 | |
| EP | 3275214 | 12/2015 | |
| WO | WO-2020240981 A1 * | 12/2020 | ............... G06N 3/02 |

OTHER PUBLICATIONS

U.S. Appl. No. 18/622,172, filed Mar. 29, 2024, Aarthi Ravi, et al.

*Primary Examiner* — Tarek Chbouki
(74) *Attorney, Agent, or Firm* — Robert C. Kowert; Kowert, Hood, Munyon, Rankin & Goetzel, P.C.

(57) ABSTRACT

A data conformance service determines, based at least on an information model of a machine at a remote site of a client, cloud test code to be executed by the data conformance service to perform at least a first type of conformance test for data provided by the machine and edge test code to be executed by an edge gateway at the remote site to perform at least a second type of conformance test for the data from the machine. The service deploys the edge test code to the edge gateway. The service receives data from the machine and executes the cloud test code using the data to generate cloud test results. The service receives edge test results and generates, based on the cloud and edge results, an indication of whether the data from the machine conforms to a specification.

20 Claims, 8 Drawing Sheets

(56)         References Cited

U.S. PATENT DOCUMENTS

| 2024/0134360 | A1 | 4/2024 | Dones |
| 2024/0160811 | A1 | 5/2024 | Shah |
| 2024/0249168 | A1 | 7/2024 | Abolhassani |

* cited by examiner

Conformance scenario creation

300

| Description | Parameters | |
| --- | --- | --- |
| Value in range ☐ Check if the node is in numerical range defined by the scenario | Lower bound | Upper bound |
| Average value ☐ Calculate node variable average value | Lower bound | Upper bound |

■

■

■

Cancel    (Add to scenario)

FIG. 3

Conformance scenario results

400

| | Scenario name | Description | Last run on | Status | Actions |
|---|---|---|---|---|---|
| ○ | Scenario 4 | (description for scenario 4) | 2025-11-18 | ↻ Running | ⊛ ◉ ▣ |
| ○ | Scenario 3 | (description for scenario 3) | 2025-11-18 | ⊘ Passed | ▲ ◉ ▣ |
| ○ | Scenario 2 | (description for scenario 2) | 2025-11-12 | ⊘ Passed | ▲ ◉ ▣ |
| ○ | Scenario 1 | (description for scenario 1) | 2025-11-10 | ⊗ Failed | ▲ ◉ ▣ |

Search conformance scenarios

View scenario

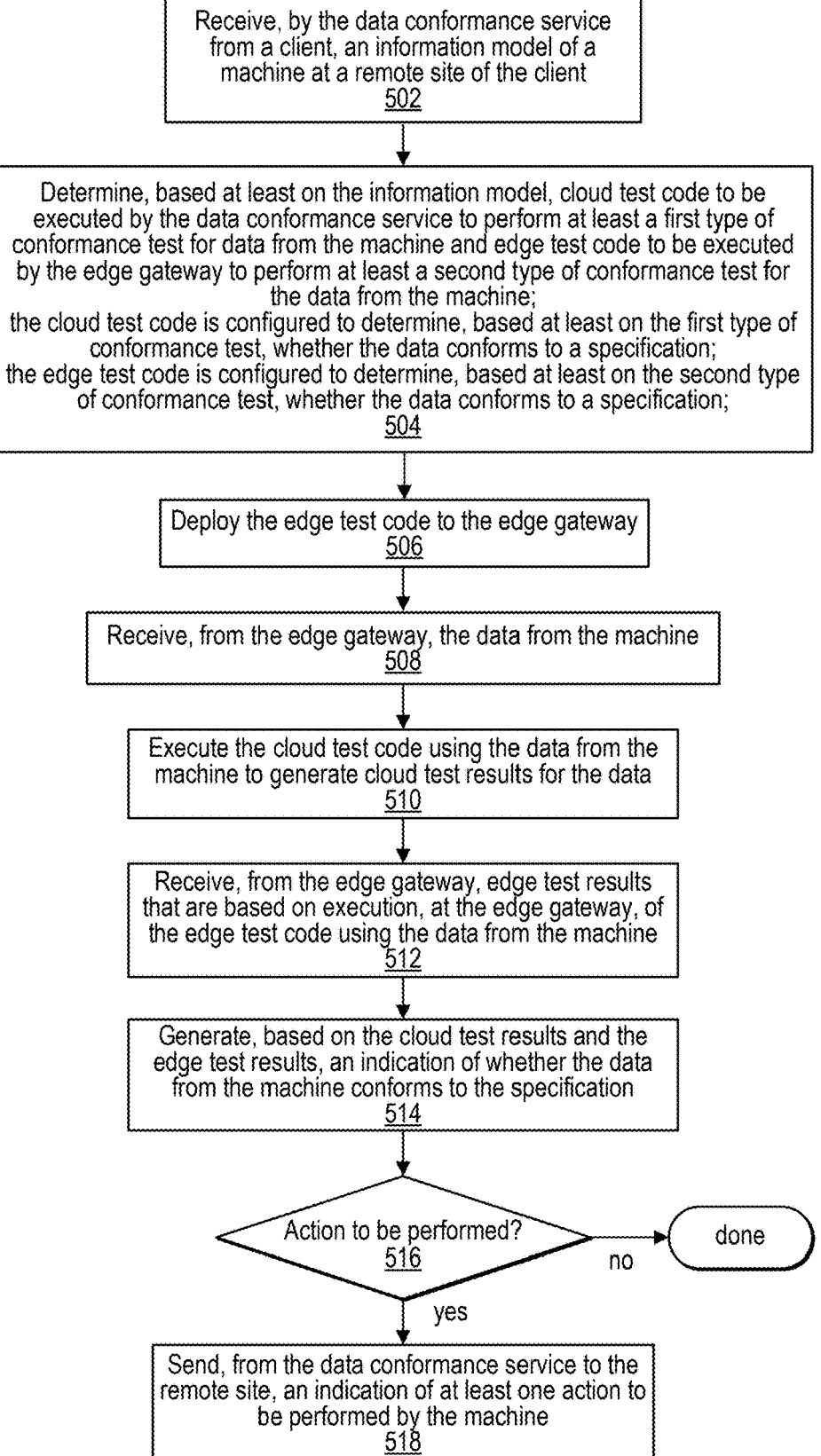

Receive, by the data conformance service
from a client, an information model of a
machine at a remote site of the client
502

Determine, based at least on the information model, cloud test code to be
executed by the data conformance service to perform at least a first type of
conformance test for data from the machine and edge test code to be executed
by the edge gateway to perform at least a second type of conformance test for
the data from the machine;
the cloud test code is configured to determine, based at least on the first type of
conformance test, whether the data conforms to a specification;
the edge test code is configured to determine, based at least on the second type
of conformance test, whether the data conforms to a specification;
504

Deploy the edge test code to the edge gateway
506

Receive, from the edge gateway, the data from the machine
508

Execute the cloud test code using the data from the
machine to generate cloud test results for the data
510

Receive, from the edge gateway, edge test results
that are based on execution, at the edge gateway, of
the edge test code using the data from the machine
512

Generate, based on the cloud test results and the
edge test results, an indication of whether the data
from the machine conforms to the specification
514

Action to be performed?
516 done no yes

Send, from the data conformance service to the
remote site, an indication of at least one action to
be performed by the machine
518

FIG. 5

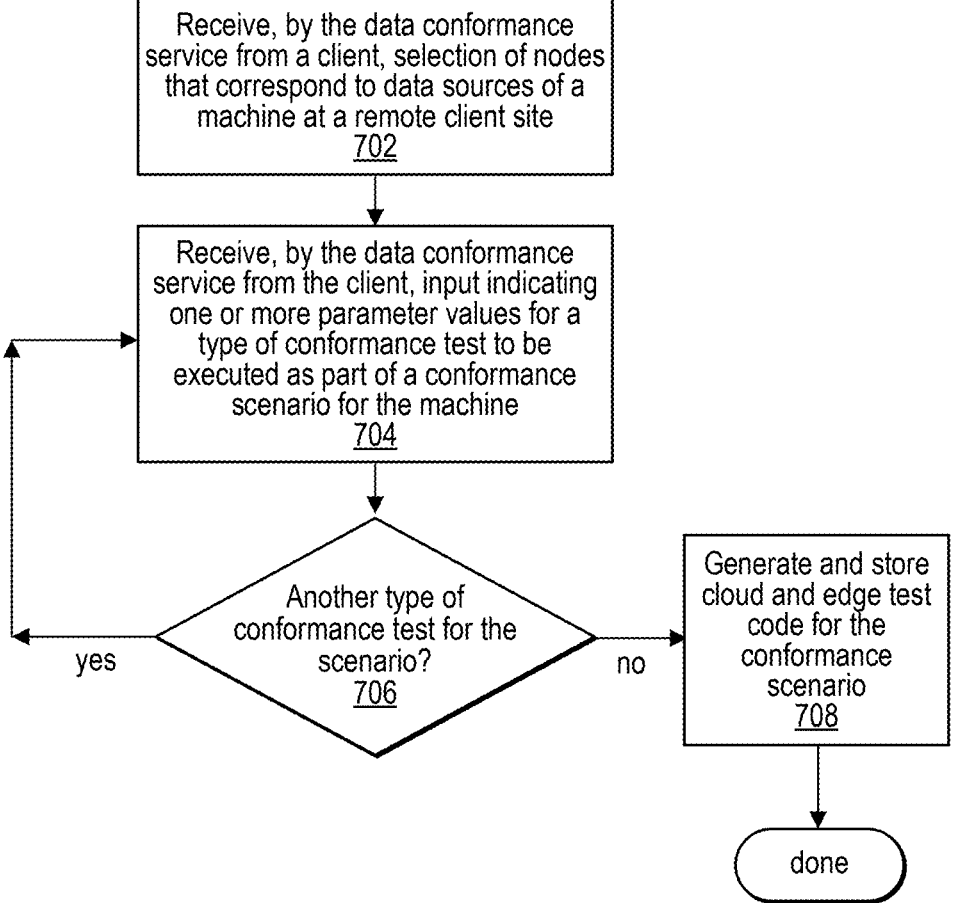

Receive, by the data conformance service from a client, selection of nodes that correspond to data sources of a machine at a remote client site
702

Receive, by the data conformance service from the client, input indicating one or more parameter values for a type of conformance test to be executed as part of a conformance scenario for the machine
704

Another type of conformance test for the scenario?
706 yes no

Generate and store cloud and edge test code for the conformance scenario
708 done

FIG. 7

CLOUD-BASED TESTING AND IMPROVEMENT OF DATA QUALITY FOR MACHINES AT A CLIENT SITE

BACKGROUND

Services offered by cloud-based service provider networks are used by clients across various industries as a convenient and efficient way to manage machines/devices located on-site. For example, a manufacturer may use a data analysis service of a provider network to collect and analyze data gathered from different machines at a product manufacturing plant, in order to monitor the performance of the machines with respect to assembling various products.

Industrial systems often have complex structures and data formats that vary between plants and machines. A typical large manufacturer may operate many different plants, thousands of machines, and millions of variables to manage (e.g., data from various sensors). To handle this complexity, manufacturers adopt certain standards/specifications. For example, Open Platform Communications (OPC) Unified Architecture (UA) is a widely adopted standard for secure and reliable data exchange in industrial environments. However, as data flows from client-side machines through cloud systems, ensuring data quality and integrity at high volumes and velocities can be extremely challenging.

BRIEF DESCRIPTION OF THE DRAWINGS

FIG. 3 is a diagram illustrating a user interface for configuring parameter values for different types of conformance tests of a conformance scenario, according to some embodiments.

FIG. 4 is a diagram illustrating a user interface for providing results of conformance tests of a conformance scenario, according to some embodiments.

FIG. 5 is a high-level flowchart illustrating various methods and techniques for cloud-based testing and improvement of data quality for machines at a client site, according to some embodiments.

FIG. 7 is a high-level flowchart illustrating various methods and techniques for configuring parameter values for different types of conformance tests of a conformance scenario, according to some embodiments.

Figure 1:
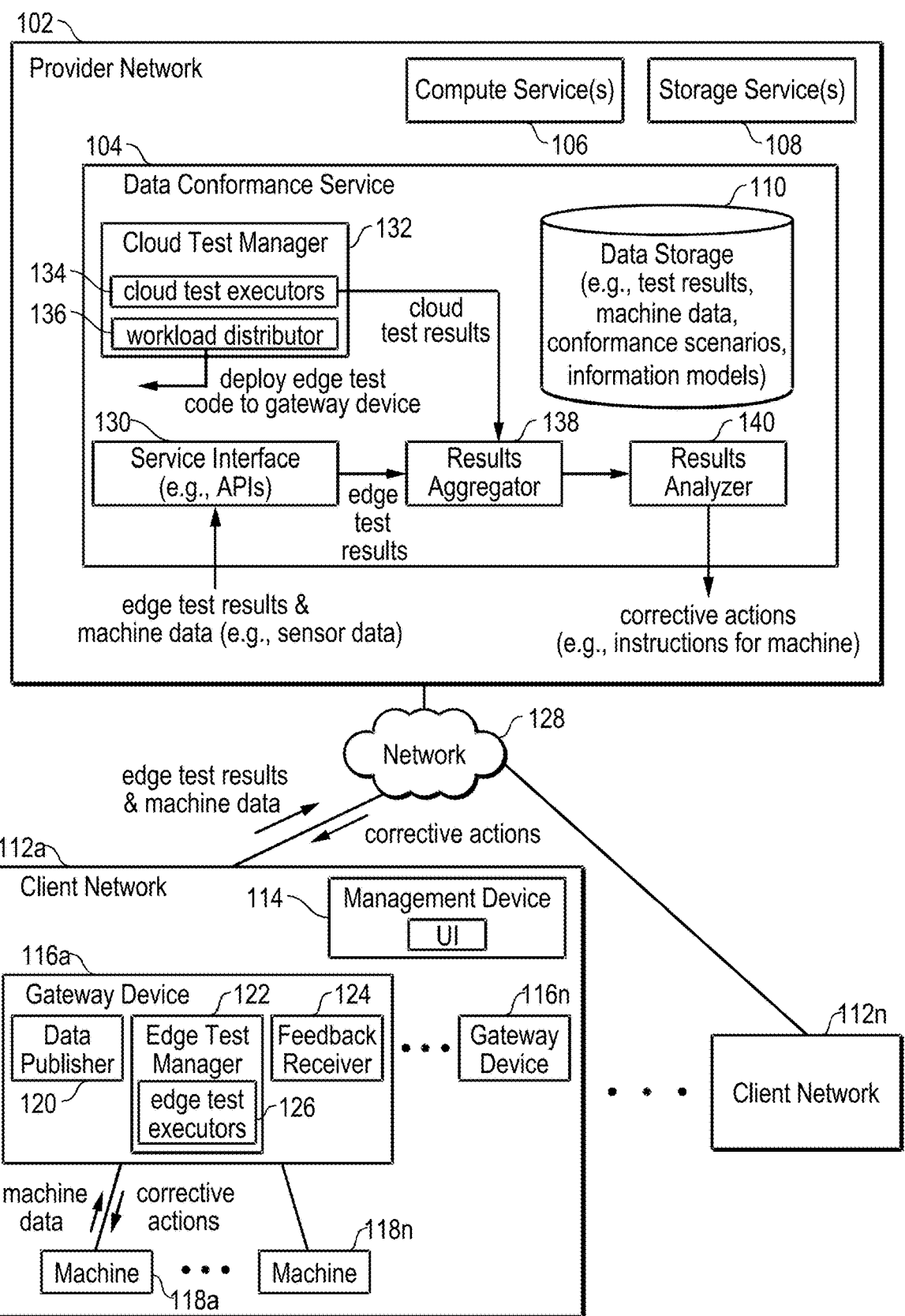
FIG. 1 is a logical block diagram illustrating a system for cloud-based testing and improvement of data quality for machines at a client site, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments for cloud-based testing and improvement of data quality for machines at a client site, according to some embodiments. In embodiments, a data conformance service of a service provider network may be used by any number of different clients (e.g., manufacturers or other organizations) to test data quality and/or improve data quality for any number of machines at any number of sites of the client.

Industrial systems often have complex structures and data formats that vary between plants and machines. A typical large manufacturer may operate many different plants, thousands of machines, and millions of variables to manage (e.g., data from various sensors). To handle this complexity, manufacturers adopt certain standards/specifications, such as a protocol for data communication. For example, Open Platform Communications (OPC) Unified Architecture (UA) is a widely adopted standard for secure and reliable data exchange in industrial environments. However, as OPC-UA data flows from client-side machines through cloud systems, ensuring data quality and integrity at high volumes and velocities can be extremely challenging.

Testing data quality (e.g., conformance with a specification, such as OPC-UA or any other type of protocol/standard) for machines at a client site, as described herein, may use fewer computing resources, may be more accurate, and/or may be performed at a faster and more efficient manner than testing data quality for machines using traditional techniques. For example, a data conformance service may intelligently deploy code to an edge device at the client site to execute certain types of protocol conformance tests in order to improve accuracy of the tests and/or to reduce the time to perform the tests, compared to executing them at the provider network. In embodiments, providing the ability for users to quickly and efficiently configure different types of tests (e.g., for a particular conformance scenario) may reduce the complexity, time, and/or amount of manual labor required compared to traditional techniques, in order to test data quality and/or improve data quality for machines at a client site (e.g., by improving accuracy/efficiency of data conformance tests and implementing corrective actions to improve data quality).

In various embodiments, the components illustrated in the figures may be implemented directly within computer hardware, as instructions directly or indirectly executable by computer hardware (e.g., a microprocessor or computer system), or using a combination of these techniques. For example, the components of the figures may be implemented by a system that includes one or more computing nodes, in one embodiment, each of which may be similar to the computer system embodiment illustrated in FIG. 8 and described below.

This specification begins with a description of a system for cloud-based testing and improvement of data quality for machines at a client site. A number of different methods and techniques for cloud-based testing and improvement of data quality for machines at a client site are discussed, some of which are illustrated in accompanying flowcharts. Finally, a description of an example computing system upon which the various components, modules, systems, and/or techniques described herein may be implemented is provided. Various examples are provided throughout the specification.

FIG. 1 is a logical block diagram illustrating a system for cloud-based testing and improvement of data quality for machines at a client site, according to some embodiments.

As shown, a provider network 102 includes a data conformance service 104 that implements cloud-based testing and improvement of data quality for machines at a client site. In embodiments, the provider network 102 includes any number of other services, such as compute services 106 and/or storage services 108.

In embodiments, any of the compute, storage, and/or other functionality described for the data conformance service 104 may be provided, at least in part, by compute services 106, storage services 108, and/or other services. For example, a storage service may maintain/store test results, machine data (e.g., data from sensors), conformance scenarios, and information models for machines. In the example embodiment, the data conformance service 104 stores this data in data storage 110.

In embodiments, any number of clients of the data conformance service 104 may each have one or more client sites 112, and a given client site may include at least one management device 114 that allows a user/administrator to access/configure the data conformance service 104 via a user interface (UI), any number of gateway devices 116, and/or any number of machines 118 that may communicate with a gateway device (e.g., over a local client network). Any given gateway device 116 may implement an "edge gateway" that may perform various functions, examples of which are described herein.

In the example embodiment, the edge gateway for gateway device 116*a* implements a data publisher 120, an edge test manager 122, and a feedback receiver 124. The edge test manager 122 implements edge test executors 126, described below. Also shown is a network 128 (e.g., the Internet or other wide area network) that may allow any devices at client sites to communicate with the provider network. In embodiments, the devices/machines at a client site are connected to a local client network of the client site, and the provider network is a remote network (e.g., remote with respect to the local client network).

As depicted, the data conformance service 104 includes a service interface 130 (e.g., application programming interface (API)) that may receive machine data and/or edge test results, described below. The service interface may also receive client input from a management device 114 of a remote client network 112 to configure various aspects of the service (e.g., via a UI provided by a display of the management device 114, a command line interface, API commands or requests, etc.). In embodiments, a user may provide input via a graphical user interface or command line interface of the display. For example, the service interface 130 may receive, from a user of a client, input indicating one or more parameter values for one or more different types of conformance tests (e.g., tests that are to be performed as part of a conformance scenario).

As shown, the data conformance service 104 includes a cloud test manager 132 that implements cloud test executors 134 and a workload distributor 136. The data conformance service 104 also includes a results aggregator 138 that processes cloud test results from the cloud test executors 134 (e.g., results from one or more conformance tests performed by the service) and edge test results from edge test executors 126 (e.g., results from one or more conformance tests performed by the gateway device). The results analyzer 140 may receive the processed data from the results aggregator (e.g., processed cloud results and/or processed test results) and analyze the processed data.

For example, the results analyzer 140 may generate, based on the cloud test results and the edge test results, an indication of whether the data from a machine (e.g., machine 118*a*) conforms to a particular specification (e.g., protocol). For example, the results analyzer may generate an indication of whether the machine data conforms to an OPC-UA standard/specification and/or any additional specifications that may be added to the OPC-UA standard (e.g., additional specifications added by the client or other entity for the machine that data is to conform to, on top of the OPC-UA standard). In some embodiments, the results analyzer 140 may determine, based on the cloud test results and the edge test results, one or more actions to be performed by the machine and send, to the remote site (e.g., to the gateway device), an indication of the one or more actions to be performed by the machine (e.g., one or more instructions for the machine that will cause the machine to perform the one or more actions). Note that although OPC-UA is used as an example of a particular specification or protocol that the data conformance service 104 checks the conformance of, in various embodiments the service may check whether data conforms to any other specification/protocol (e.g., any other standard specification/protocol and/or a custom specification/protocol defined by a client) and/or any additional specification added to the specification/protocol.

In embodiments, the data conformance service 104 receives, from a client, an information model of a machine at a remote site of the client. For example, the data conformance service 104 may receive, from the remote site of the client, the information model of the machine (e.g., from the gateway device and/or the machine). As another example, the data conformance service 104 may receive, from a user of a management device, a selection of the information model of the machine from among any number of information models available at the data conformance service for selection.

In an embodiment, the data conformance service 104 determines, based at least on the information model, cloud test code to be executed by the data conformance service to perform one or more types of conformance tests for data provided by the machine and edge test code to be executed by the edge gateway to perform one or more other types of conformance test for the data from the machine. The cloud test code is configured to determine, based on the one or more types of conformance tests (e.g., a format validation test), whether the data from the machine conforms to a specification. Similarly, the edge test code is configured to determine, based on the one or more other types of conformance tests (e.g., an OPC-UA server connectivity test or other protocol server connectivity test), whether the data from the machine conforms to the specification.

In various embodiments, the data conformance service 104 (e.g., the workload distributor 136) intelligently determines which types of conformance tests (and the corresponding test code) are to be implemented by the data conformance service 104 (e.g., the cloud) and which types of conformance tests (and the corresponding test code) are to be implemented by the edge gateway at the edge device (e.g., the edge), based on any number of factors. For example, the workload distributor 136 may determine, based on one or more factors, that test code to perform at least the second type of conformance test is to be executed by the edge gateway, wherein the factors comprise one or more of:

one or more test type constraints associated with at least the second type of conformance test (e.g., direct access to a data stream of the machine and/or execution at the edge gateway for real-time processing), an amount of data to be transferred to the data conformance service in order to perform at least the second type of conformance test at the edge gateway (e.g., greater than 10 GB), or available bandwidth between the data conformance service and the edge gateway (e.g., less than 1 GB/second).

In embodiments, the data conformance service 104 (e.g., the workload distributor 136) then deploys the edge test code to the edge gateway. At a later point, the data conformance service 104 receives data from the machine (e.g., a set of data collected during a particular time window) and executes the cloud test code (e.g., using the cloud test executors) using the data from the machine to generate cloud test results for the data. The data conformance service 104 also receives, from the edge gateway, edge test results that are based on execution, at the edge gateway, of the edge test code using the data from the machine. The data conformance service 104 (e.g., results aggregator 138 or results analyzer 140) may then generate, based on the cloud test results and the edge test results, an indication of whether the data from the machine conforms to the specification.

In some embodiments, the service may determine updated cloud and/or edge test code based on a different information model for the machine (e.g., different version of the information model). For example, the service may receive, from the client, another information model of the machine at the remote site (e.g., a new version). In response, the service may determine, based on the other information model, updated cloud test code to be executed by the data conformance service to perform one or more first types of conformance tests for additional data from the machine (e.g., additional data collected in a future time window) and updated edge test code to be executed by the edge gateway to perform one or more second types of conformance tests for the additional data from the machine. The service may then deploy the updated edge test code to the edge gateway.

In embodiments, the service may add any number of additional conformance tests for implementation by the service and/or any number of additional conformance tests for implementation by the edge gateway (e.g., based on client/user input). For example, the service may receive, from the client, input selecting an additional type of conformance test for the machine from among any number of additional types of conformance tests available for selection. In response, the service may determine, based at least on the additional type of conformance test, either additional cloud test code to be executed by the data conformance service to perform the additional type of conformance test for additional data from the machine, or additional edge test code to be executed by the edge gateway at the remote site to perform the additional type of conformance test for additional data from the machine (e.g., depending on one or more factors, as described herein).

Embodiments may improve accuracy of data conformance tests and improve data quality by providing a flexible and scalable system/service. A data ingestion layer (e.g., at the edge gateway) may handle reception, processing, and scaling of OPC-UA data or other protocol data (telemetry, information model, machine health, events and alarms) from programmable logic controllers (PLCs). Data buffering and queuing may decouple data ingestion from testing processes for high throughput. Through distributed testing orchestration, the service can coordinate and manage the execution of test modules across distributed edge gateways and cloud environments. This includes scheduling, load balancing, fault tolerance, and result aggregation from multiple sources.

Modular test modules may support integration of test modules for various data quality aspects, such as format validation, range checks, consistency checks, outlier detection, time-series analysis, security validation and specification adherence (e.g., adherence to OPC-UA specification or other protocol specification). Modules may be containerized or deployed as scalable services for easy management.

The system may allow users/clients to configure tests using provided supported test types (e.g., format validation, range checks, consistency checks) to cater to specific data quality requirements or domain-specific tests, providing flexibility and extensibility to the testing framework. These tests may be run against any type of data, including telemetry, information models, and machine health data.

Test result processing and reporting may be performed. The service may collect and analyze test results, identify issues, generates reports, and triggers notifications based on thresholds. In scenarios where cloud connectivity is limited or testing in the cloud is not feasible, the system may support deploying test modules and orchestration components at the edge, closer to the data sources. This allows for localized testing, minimizing data transfer requirements, and enabling real-time data quality checks.

The system may seamlessly integrate edge and cloud components, enabling a hybrid architecture where data quality tests can be executed at the edge, with results and aggregated reports communicated to the cloud for centralized monitoring, analysis, and decision-making. The system may also support continuous data quality monitoring by integrating with data streams or pipelines. Test modules can be configured to run at regular intervals, upon data ingestion, or triggered by specific events, ensuring real-time data quality checks and timely issue detection. The system may also support feedback and corrective actions at the edge level. Test results and identified issues can enable continuous improvements by triggering control actions to PLCs, enabling real-time data quality improvements.

Figure 2:
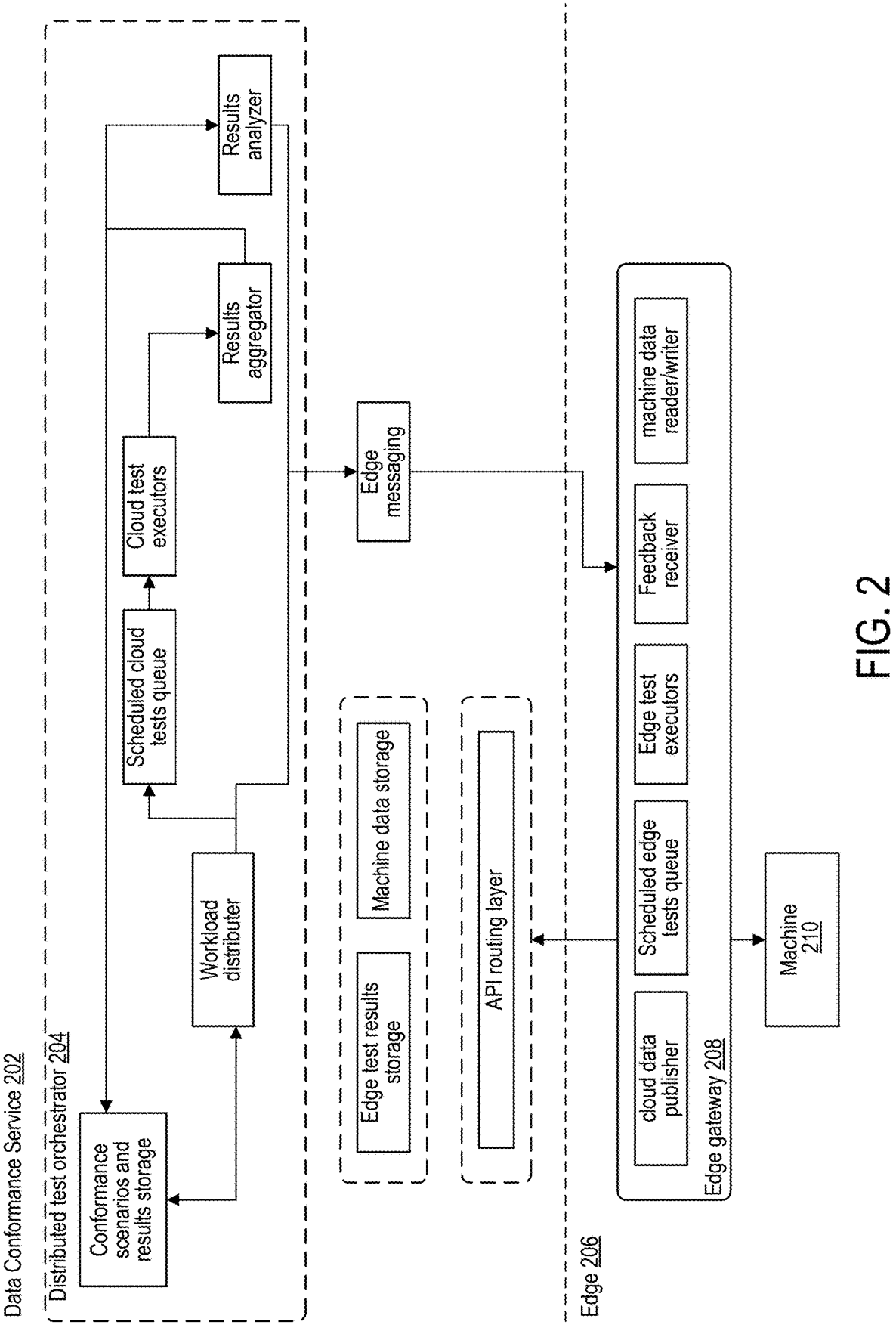
FIG. 2 is a logical block diagram illustrating a system for cloud-based testing and improvement of data quality for machines at a client site, according to some embodiments.

In embodiments, a modular and scalable architecture provides comprehensive data quality testing, scalability for high-speed testing, flexibility and extensibility, real-time monitoring and reporting, and continuous improvement through feedback and corrective actions. Embodiments may ensure adherence to specifications, data integrity, and reliability, enabling clients to optimize their industrial processes and applications based on high-quality data FIG. 2 is a logical block diagram illustrating a system for cloud-based testing and improvement of data quality for machines at a client site, according to some embodiments.

In the depicted embodiment, the data conformance service 202 includes a distributed test orchestrator 204 as well as other components, described below. The edge 206 includes an edge gateway 208 (e.g., implemented by a gateway device 116) and a machine 210.

In some embodiments, a conformance scenario represents a specific set of test cases or steps that are designed to validate the conformance of an implementation to a particular specification (e.g., OPC-UA or other protocol). Each scenario comprises tests for a set of nodes. Each node test includes one or more of the allowed step types. Each conformance scenario may be associated with a particular information model (e.g., an OPC-UA information model or other protocol information model).

In embodiments, conformance scenario step types may represent the specific test cases or validation checks that are performed to assess the conformance of the implementation. These may be categorized as format validation, range checks, consistency checks, outlier detection, time-series analysis, security validation and specification adherence (e.g., adherence to the OPC-UA specification or other protocol specification).

The cloud data publisher of the edge gateway 208 may publish data (telemetry, information model, machine health, events, and alarms) from the edge to the cloud. It works in coordination with the machine data reader/writer component on the edge, collecting the necessary data and securely transmitting it to the cloud-based components.

The cloud data publisher leverages cloud service APIs to communicate with the cloud (e.g., the data conformance service 104), ensuring reliable and secure data transfer. The scheduled edge tests queue manages the queue of scheduled tests to be executed on the edge, based on the instructions received from the cloud-based distributed test orchestrator.

The edge test executors are responsible for running specific data quality tests that are better suited for the edge computing environment, closer to the data sources (e.g., data sources of the machine or in communication with the machine). This is because certain tests require direct access to the data streams, need to be performed in real-time, and/or are constrained by network bandwidth limitations. For example, a test for "Server Connectivity and Data Refresh Validation" my include checking the continuous connectivity between the edge device and the server of the machine and/or verifying that the machine server is refreshing the data at the expected frequency or cycle time. This test may require direct access to the machine server and cannot rely on delayed data ingestion into the cloud, due to real-time requirements and bandwidth constraints. As another example, a test for "Security Validation" may include checking the identity and authorization of the clients connecting to the machine server and validating the security certificates and ensuring the secure communication between the edge device and the machine server. These security-related checks may need to be performed at the edge to protect the data and prevent unauthorized access, especially in scenarios with limited cloud connectivity and bandwidth.

The feedback receiver listens for corrective actions (e.g., control instructions) from the cloud, based on the test results and identified issues. It processes the feedback and triggers the necessary control actions (e.g., invoke methods) using the data writer component. The data reader component is responsible for reading the data (telemetry, information model, machine health, events, and alarms) from machine servers. The data writer component is responsible for writing the corrective actions or control instructions back to the PLCs.

The API routing layer serves as the central entry point for ingesting and querying machine data. The machine data storage component is responsible for persisting data collected from the machine (e.g., telemetry data, events, information model, relationships between nodes). It stores and manages the high-volume, time-series data generated by the industrial equipment and processes. The conformance scenarios and results storage component is responsible for managing the configuration and metadata related to the conformance test scenarios, as well as persisting the results of the data quality tests, both from the edge and cloud-based executions. It ensures the scalable and durable storage of the test scenarios and the corresponding test results, which can be used for reporting, analysis, and continuous improvement of the data quality. The edge messaging component is responsible for facilitating the communication from cloud to edge (e.g., using MQTT).

The workload distributor is responsible for dynamically allocating the execution of conformance scenario test steps across the available compute resources in the distributed cloud and edge environments. It employs intelligent decision-making to determine the optimal placement of test executions based on any number of factors, which may include test type constraints, data collection costs, and/or bandwidth considerations. In embodiments, the workload distributor may schedule the execution of conformance test scenarios.

With respect to test type constraints, the workload distributor considers the specific requirements of each test module. For example, it assigns tests like Server Connectivity and Data Refresh Validation, and Security Validation, to the edge environment, as these tests require direct access to the data streams and real-time processing capabilities.

With respect to data collection cost, the workload distributor takes into account the customer's preferences regarding data collection and processing costs. It may prioritize executing certain tests at the edge to minimize the amount of telemetry data that needs to be transferred to the cloud.

With respect to bandwidth considerations, the workload distributor monitors the available bandwidth between the edge and cloud environments, and intelligently distributes the test workload to avoid exceeding the bandwidth constraints and ensuring efficient data transfer.

When the scheduler determines the appropriate timing for a test to be executed, the test is added to the Cloud Scheduled Tests Queue. The Cloud Test Executors are responsible for processing the test execution requests from the scheduling and orchestration components (e.g., queued in the scheduled cloud tests queue), and coordinating the execution of the data quality test steps in the cloud environment. These components receive the test execution requests, identify the necessary data sources, retrieve the relevant data (e.g., information model and/or other data), execute the appropriate test steps, and update the test results accordingly. For test steps that require access to the telemetry data, the Cloud Test Executors will retrieve the necessary data from the machine data storage (e.g., telemetry data).

The Results Aggregator is responsible for consolidating the test results from the Cloud Test Executors and Edge Test Executors. It aggregates and analyzes the results from all test steps within a scenario, as well as all scenarios associated with a particular information model. The Results Aggregator first monitors the execution of individual test steps, collecting the results and waiting for all steps within a scenario to complete. After gathering the results for all steps in a scenario, it assesses the overall conformance of that scenario. The Aggregator then waits for all scenarios associated with an information model to complete, and analyzes the overall conformance of the information model based on the individual scenario results.

The Results Aggregator generates comprehensive reports on the conformance assessment at both the scenario and information model levels, and can trigger notifications based on predefined thresholds or identified issues. The Results Analyzer determines the appropriate corrective actions that need to be taken to improve the data quality, such as changing specific settings in the machine server (e.g., based on the analysis/results of the results aggregator).

In embodiments, a data quality testing process flow may be followed as described below. User Creates Conformance Scenarios: A user creates Conformance Scenarios and associates them with specific versions of the information model. These Conformance Scenarios define the test cases and steps required to validate the conformance of the implementation. Scheduling Conformance Tests: When a new version of the information model becomes available, the workload distributor determines the appropriate timing to execute the associated Conformance Scenarios. The workload distributor may schedule the execution of the Conformance Scenarios based on the data duration requirements of the individual test steps, in some embodiments.

Workload Distribution: The Workload Distributor component intelligently distributes the execution of the Conformance Scenario test steps across the available edge and cloud resources. The Workload Distributor considers factors like test type constraints, data collection costs, and bandwidth limitations to optimize the placement of the tests. Test Execution: The Conformance Scenario test steps are executed across the edge and cloud environments, utilizing the Cloud Test Executors and Edge Test Executors components. These components retrieve the necessary data from the various storage layers (telemetry, events, etc.) to perform the required data quality checks.

Results Aggregation: The Results Aggregator component collects and consolidates the test results from the edge and cloud test executions. It ensures that the results from all test steps within a Conformance Scenario, as well as the results from all Conformance Scenarios associated with a particular information model, are aggregated and analyzed. Results Analysis and Corrective Actions: The Results Analyzer component determines the appropriate corrective actions that need to be taken, such as changing specific settings in the machine server. The corrective actions are then communicated back to the machine server to improve the overall data quality.

FIG. 3 is a diagram illustrating a user interface for configuring parameter values for different types of conformance tests of a conformance scenario, according to some embodiments.

As shown, a client/user may provide input for a conformance scenario creation 300 interface in order to configure tests for a particular conformance scenario for a machine. In the example embodiment, the user may configure whether to check if a node is in a numerical range (including a lower and upper bound for the range parameter). In the depicted example, the user may also configure whether to check for an average value for a node variable (including a lower and upper bound for the range parameter). In various embodiments, a conformance scenario may include any number of different tests instead of and/or in addition to either of the above tests. Furthermore, each test may include any number of parameters used to configure the test.

FIG. 4 is a diagram illustrating a user interface for providing results of conformance tests of a conformance scenario, according to some embodiments.

In the example embodiment, a user/client may provide input to a user interface 400 to view and/or configure different conformance scenarios for a machine at a remote client site. For example, the user may assign a particular version of an information model to a particular scenario. As shown, the user interface also displays the current status for each conformance scenario (e.g., running, passed failed). In the depicted example, scenario 4 is currently running, conformance scenarios 2 and 3 have passed, and conformance scenario 1 has failed. In embodiments, the user interface may be used to configure any number of conformance scenarios across any number of machines and/or any number of different client sites, based on user input indicating the machines and/or client sites.

FIG. 5 is a high-level flowchart illustrating various methods and techniques for cloud-based testing and improvement of data quality for machines at a client site, according to some embodiments.

At block 502, the data conformance service receives, by the data conformance service from a client, an information model of a machine at a remote site of the client (e.g., from a machine at the remote site). In some embodiments, the data conformance service receives, from the client, a selection of the information model of the machine from among a plurality of information models available at the data conformance service for selection (e.g., selection by a user, via a user interface provided by the service that lists any number of information models that are currently available for selection).

At block 504, the data conformance service determines, based at least on the information model, cloud test code to be executed by the data conformance service to perform at least a first type of conformance test for data from the machine and edge test code to be executed by the edge gateway to perform at least a second type of conformance test for the data from the machine. The cloud test code is configured to determine, based at least on the first type of conformance test, whether the data conforms to a specification, and the edge test code is configured to determine, based at least on the second type of conformance test, whether the data conforms to a specification.

At block 506, the data conformance service deploys the edge test code to the edge gateway. At block 508, the data conformance service receives, from the edge gateway, the data from the machine. At block 510, the data conformance service executes the cloud test code using the data from the machine to generate cloud test results for the data.

At block 512, the data conformance service receives, from the edge gateway, edge test results that are based on execution, at the edge gateway, of the edge test code using the data from the machine. At block 514, the data conformance service generates, based on the cloud test results and the edge test results, an indication of whether the data from the machine conforms to the specification.

At block 516, the data conformance service determines, based on the cloud test results and/or the edge test results, whether an action is to be performed at the machine. If so, then at block 518, the data conformance service sends, from the data conformance service to the remote site, an indication of at least one action to be performed by the machine. If not, then the process is done.

In embodiments, the data conformance service may receive, from the client, another information model of the machine at the remote site and determine, based on the other information model, updated cloud test code to be executed by the data conformance service to perform at least the first type of conformance test for additional data from the machine and updated edge test code to be executed by the edge gateway to perform at least the second type of conformance test for the additional data from the machine. The conformance service may then deploy the updated edge test code to the edge gateway.

In various embodiments, the data conformance service may determine, based on any number of factors, that test code to perform a particular type of conformance test is to be executed by the edge gateway (based on one or more factors). For example, the factors may include one or more of: one or more test type constraints associated with the particular type of conformance test (e.g., the type of conformance test is to be performed at the edge), an amount of data to be transferred to the data conformance service in order to perform the particular type of conformance test at the edge gateway (e.g., the amount of data to be transferred from the edge gateway to the data conformance service is less than a threshold amount), and available bandwidth between the data conformance service and the edge gateway (e.g., the available bandwidth is greater than a threshold amount).

Figure 6:
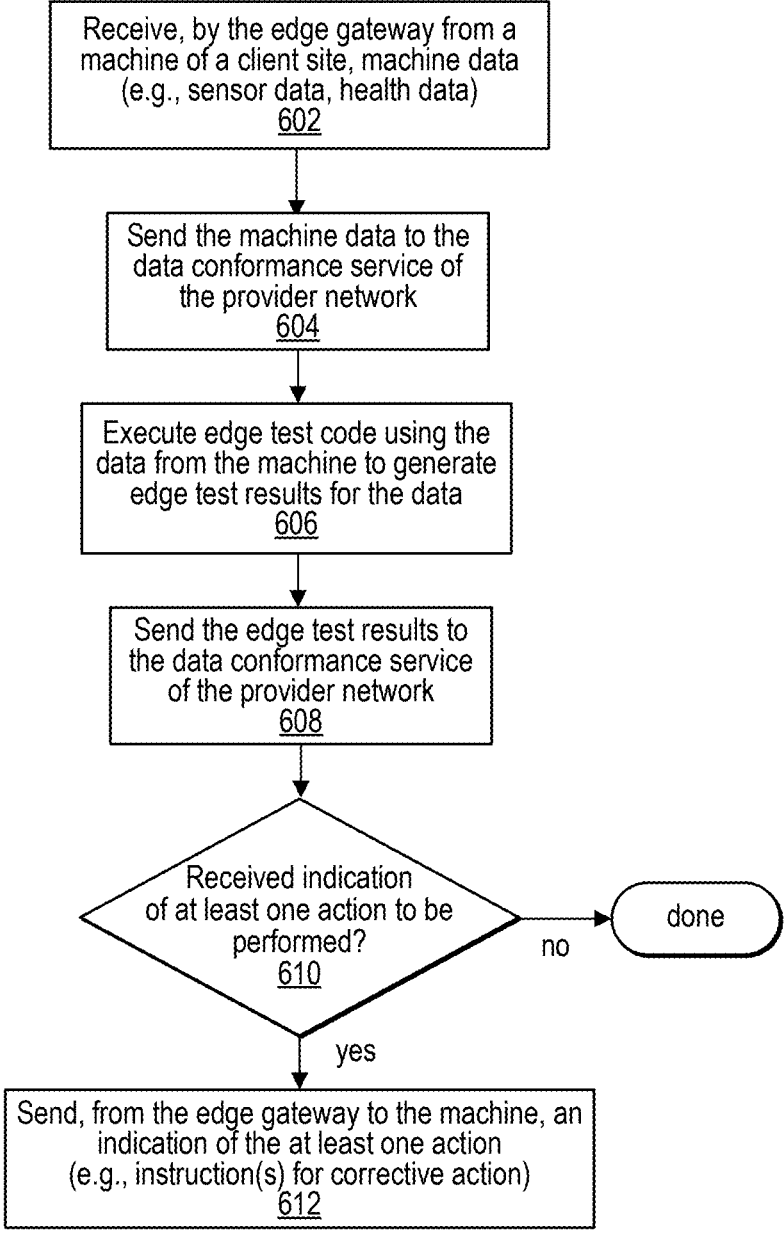
FIG. 6 is a high-level flowchart illustrating various methods and techniques for cloud-based testing and improvement of data quality for machines at a client site, according to some embodiments.

FIG. 6 is a high-level flowchart illustrating various methods and techniques for cloud-based testing and improvement of data quality for machines at a client site, according to some embodiments.

At block 602, the edge gateway receives, from a machine of a client site, machine data (e.g., sensor data, health data). At block 604, the edge gateway sends the machine data to the data conformance service of the provider network. At block 606, the edge gateway executes edge test code using the data from the machine to generate edge test results for the data. At block 608, the edge gateway sends the edge test results to the data conformance service of the provider network. At block 610, the edge gateway determines whether it has received an indication of one or more actions to be performed at the machine. If so, then at block 612, the edge gateway sends, from the edge gateway to the machine, an indication of the at least one action (e.g., an instruction). If not, then the process is done.

FIG. 7 is a high-level flowchart illustrating various methods and techniques for configuring parameter values for different types of conformance tests of a conformance scenario, according to some embodiments.

At block 702, the data conformance service receives selection of nodes that correspond to data sources of a machine at a remote client site. At block 704, the data conformance service receives input indicating one or more parameter values for a type of conformance test to be executed as part of a conformance scenario for the machine.

At block 706, the data conformance service determines whether the user will enter another type of conformance test for the conformance scenario (e.g., based on input from the client). For example, in some embodiments, the service may receive, from the client, input selecting the type of conformance test to be performed (e.g., selection by a user, via a user interface provided by the service that lists any number of conformance tests that are currently available for selection). In embodiments, any number of a client may specify any number of conformance tests for a scenario (e.g., one or more). If so, then the process returns to block 704. If not, then at block 708, the data conformance service generates and stores cloud test code and edge test code for the conformance scenario. At a later point, the user may provide input to the service in order to run the conformance scenario.

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors.

The program instructions may implement the functionality described herein (e.g., the functionality of the service, other services, software, edge devices, and any other components/devices that implement the techniques described herein). The various methods as illustrated in the figures and described herein represent example embodiments of methods. The order of any method may be changed, and various elements may be added, reordered, combined, omitted, modified, etc.

Figure 8:
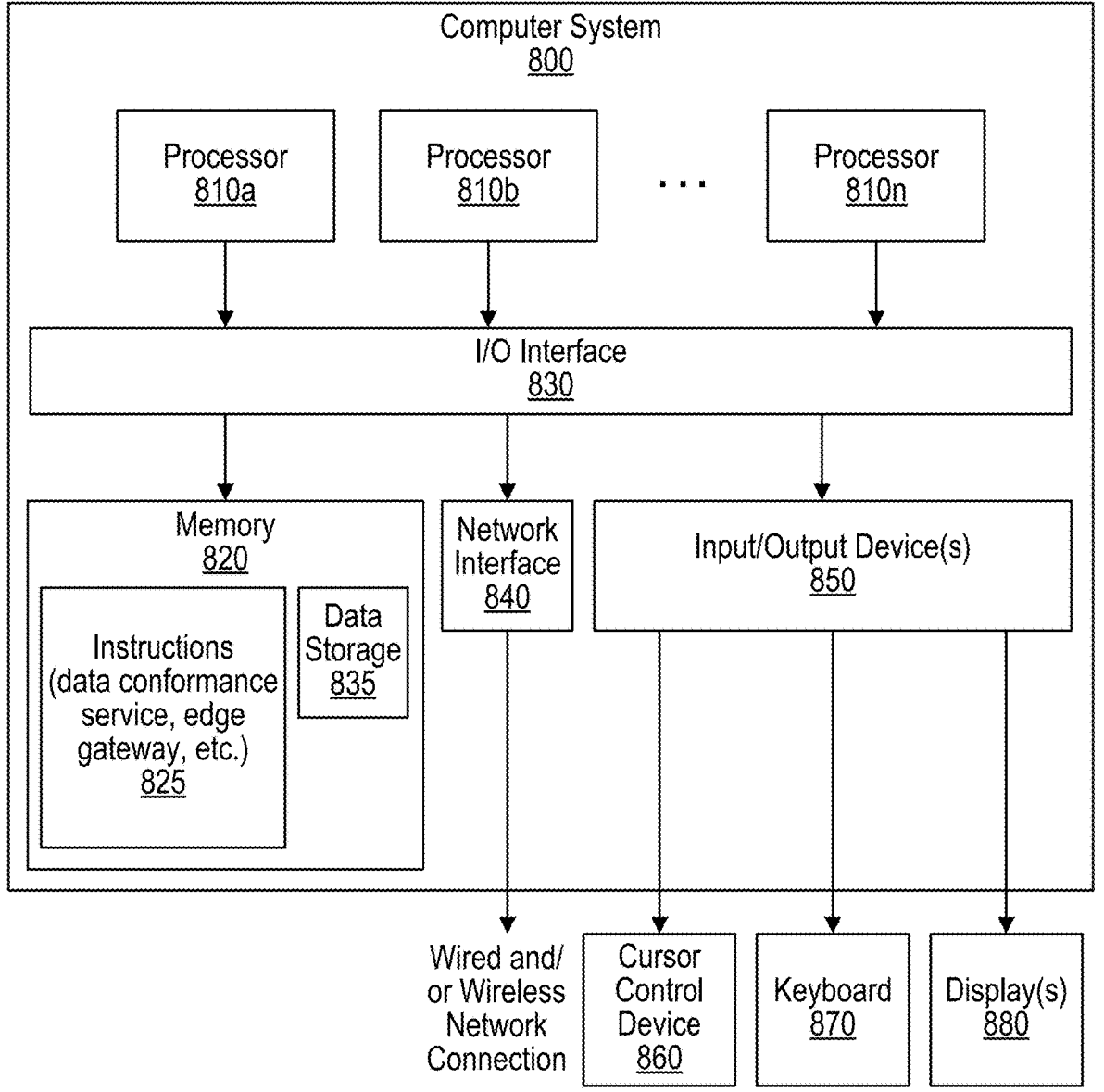
FIG. 8 is a block diagram illustrating an example computing system, according to some embodiments.

Embodiments to implement cloud-based testing and improvement of data quality for machines at a client site as described herein may be executed on one or more computer systems, which may interact with various other systems or devices. One such computer system is illustrated by FIG. 8. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node or compute node, computing device, compute device, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) may include standard computer monitor(s) and/or other display systems, technologies or devices, in one embodiment.

In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions, in one embodiment. For example, in various embodiments, processors 1010 may be general-purpose or embedded processors implementing any of a variety of instruction set architectures (ISAs), such as the x86, PowerPC, SPARC, ARM, RISC-V, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms.

For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment. In some embodiments, the at least one processor 1010 may include one or more FPGAs (field programmable gate array). For example, one or more FPGAs may be used alongside one or more CPUs (as the control plane) in order to add more compute functionality and/or compute capacity.

System memory 1020 may store program instructions 1025 and/or data accessible by processor 1010, in one embodiment. In various embodiments, system memory 1020 may be implemented using any suitable memory technology, such as static random access memory (SRAM), synchronous dynamic RAM (SDRAM), nonvolatile/Flash-type memory, or any other type of memory.

In the illustrated embodiment, program instructions and data implementing desired functions, such as those described above (e.g., the conformance service, other services, software, and any other components/devices, etc.) are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000.

A computer-accessible medium may include non-transitory storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040, in one embodiment.

In one embodiment, I/O interface 1030 may be coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010).

In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000, in one embodiment. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000, in one embodiment. Multiple input/output devices 1050 may be present in computer system 1000 or may be distributed on various nodes of computer system 1000, in one embodiment. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1025 that implement the various embodiments of the systems as described herein, and data store 1035, comprising various data accessible by program instructions 1025, in one embodiment. In one embodiment, program instructions 1025 may include software elements of embodiments as described herein and as illustrated in the Figures. Data storage 1035 may include data that may be used in embodiments (e.g., test results, machine data, scenarios, code, information models, etc.). In other embodiments, other or different software elements and data may be included.

Those skilled in the art will appreciate that computer system 1000 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device.

Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above.

In some embodiments, instructions stored on a computer-readable medium separate from computer system 1000 may be transmitted to computer system 1000 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
one or more processors and one or more memories, wherein the one or more memories have stored thereon instructions, which when executed by the one or more processors, cause the one or more processors to implement a data conformance service for a plurality of clients of a provider network, wherein the data conformance service is configured to, for a client of the plurality of clients:
    receive, from the client, an information model of a machine at a remote site of the client;
    determine, based at least on the information model of the machine at the remote site, cloud test code to be executed by the data conformance service of the provider network to perform at least a first type of conformance test for data provided by the machine of the remote site and edge test code to be executed by the edge gateway of the remote site to perform at least a second type of conformance test for the data from the machine of the remote site,
    wherein the cloud test code is configured to determine, based on at least the first type of conformance test, whether the data from the machine conforms to a specification, and
    wherein the edge test code is configured to determine, based on at least the second type of conformance test, whether the data from the machine conforms to the specification;
    deploy the edge test code to the edge gateway;
    receive, from the edge gateway, the data from the machine;
    execute the cloud test code using the data from the machine to generate cloud test results for the data;
    receive, from the edge gateway, edge test results that are based on execution, at the edge gateway, of the edge test code using the data from the machine; and
    generate, based on the cloud test results and the edge test results, an indication of whether the data from the machine conforms to the specification.

2. The system as recited in claim 1, wherein to determine the edge test code to be executed by the edge gateway to perform at least the second type of conformance test for the data from the machine, the data conformance service is further configured to:
    determine, based on one or more factors, that test code to perform at least the second type of conformance test is to be executed by the edge gateway, wherein the factors comprise one or more of:
        one or more test type constraints associated with at least the second type of conformance test,
        an amount of data to be transferred to the data conformance service in order to perform at least the second type of conformance test at the edge gateway, or
        available bandwidth between the data conformance service and the edge gateway.

3. The system as recited in claim 1, wherein the data conformance service is further configured to:
    receive, from the client, another information model of the machine at the remote site;
    determine, based on the other information model, updated cloud test code to be executed by the data conformance service to perform at least the first type of conformance test for additional data from the machine and updated edge test code to be executed by the edge gateway to perform at least the second type of conformance test for the additional data from the machine,
    deploy the updated edge test code to the edge gateway.

4. The system as recited in claim 1, wherein the data conformance service is further configured to:
    determine, based on the cloud test results and the edge test results, at least one action to be performed by the machine; and
    send, to the remote site, an indication of the at least one action to be performed by the machine.

5. The system as recited in claim 1, wherein to determine the cloud test code to be executed by the data conformance service and the edge test code to be executed by the edge gateway, the data conformance service is further configured to:
    receive, from the client, input indicating at least one parameter value for at least the first type of conformance test and at least one parameter value for the at least the second type of conformance test.

6. A method, comprising:
performing, by one or more computing devices of a provider network that implement a data conformance service:
    determining, based at least on an information model of a machine at a remote site of a client, cloud test code to be executed by the data conformance service of the provider network to perform at least a first type of conformance test for data provided by the machine of the remote site and edge test code to be executed by an edge gateway at the remote site to perform at least a second type of conformance test for the data from the machine of the remote site,
    wherein the cloud test code is configured to determine whether the data from the machine conforms to a specification, and
    wherein the edge test code is configured to determine whether the data from the machine conforms to the specification;
    deploying the edge test code to the edge gateway;
    receiving, from the edge gateway, the data from the machine;

executing the cloud test code using the data from the machine to generate cloud test results for the data;

receiving, from the edge gateway, edge test results that are based on execution, at the edge gateway, of the edge test code using the data from the machine; and generating, based on the cloud test results and the edge test results, an indication of whether the data from the machine conforms to the specification.

7. The method as recited in claim 6, further comprising:

receiving, from the client, a selection of the information model of the machine from among a plurality of information models available at the data conformance service for selection, or receiving, from the remote site of the client, the information model of the machine.

8. The method as recited in claim 6, wherein determining the edge test code to be executed by the edge gateway to perform at least the second type of conformance test for the data from the machine comprises:

determining, based on one or more factors, that test code to perform at least the second type of conformance test is to be executed by the edge gateway, wherein the factors comprise one or more of:

one or more test type constraints associated with at least the second type of conformance test, an amount of data to be transferred to the data conformance service in order to perform at least the second type of conformance test at the edge gateway, or available bandwidth between the data conformance service and the edge gateway.

9. The method as recited in claim 6, further comprising:

receiving, from the client, a selection of the information model of the machine from among a plurality of information models available at the data conformance service for selection, or receiving, from the remote site of the client, the information model of the machine; and determining, based on the other information model, updated cloud test code to be executed by the data conformance service to perform at least the first type of conformance test for additional data from the machine and updated edge test code to be executed by the edge gateway to perform at least the second type of conformance test for the additional data from the machine, deploying the updated edge test code to the edge gateway.

10. The method as recited in claim 6, further comprising:

determining, based on the cloud test results and the edge test results, at least one action to be performed by the machine; and sending, to the remote site, an indication of the at least one action to be performed by the machine.

11. The method as recited in claim 6, wherein determining the cloud test code to be executed by the data conformance service and the edge test code to be executed by the edge gateway comprises:

receiving, from the client, input indicating at least one parameter value for at least the first type of conformance test and at least one parameter value for the at least the second type of conformance test.

12. The method as recited in claim 6, further comprising:

receiving, from the client, input selecting an additional type of conformance test for the machine from among a plurality of additional types of conformance tests available for selection; and determining, based at least on the additional type of conformance test, additional cloud test code to be executed by the data conformance service to perform the additional type of conformance test for additional data from the machine.

13. The method as recited in claim 6, further comprising:

receiving, from the client, input selecting the additional type of conformance test for the machine from among a plurality of additional types of conformance tests available for selection;

determining, based at least on the additional type of conformance test for the machine, additional edge test code to be executed by the edge gateway at the remote site to perform the additional type of conformance test for additional data from the machine; and deploying the additional edge test code to the edge gateway.

14. The method as recited in claim 6, wherein the specification is compliant with Open Platform Communications (OPC) Unified Architecture (UA).

15. One or more non-transitory computer-accessible storage media storing program instructions that when executed on or across one or more processors of a provider network cause the one or more processors to implement a data conformance service to:

determine, based at least on an information model of a machine at a remote site of a client, cloud test code to be executed by the data conformance service of the provider network to perform at least a first type of conformance test for data provided by the machine of the remote site and edge test code to be executed by an edge gateway at the remote site to perform at least a second type of conformance test for the data from the machine of the remote site, wherein the cloud test code is configured to determine whether the data from the machine conforms to a specification, and wherein the edge test code is configured to determine whether the data from the machine conforms to the specification;

deploy the edge test code to the edge gateway;

receive, from the edge gateway, the data from the machine;

execute the cloud test code using the data from the machine to generate cloud test results for the data;

receive, from the edge gateway, edge test results that are based on execution, at the edge gateway, of the edge test code using the data from the machine; and generate, based on the cloud test results and the edge test results, an indication of whether the data from the machine conforms to the specification.

16. The one or more storage media as recited in claim 15, wherein the program instructions when executed on or across the one or more processors further cause the one or more processors to:

receive, from the client, a selection of the information model of the machine from among a plurality of information models available at the data conformance service for selection, or receive, from the remote site of the client, the information model of the machine.

17. The one or more storage media as recited in claim 15, wherein to determine the edge test code to be executed by the edge gateway to perform at least the second type of conformance test for the data from the machine, the program instructions when executed on or across the one or more processors further cause the one or more processors to:

determine, based on one or more factors, that test code to perform at least the second type of conformance test is to be executed by the edge gateway, wherein the factors comprise one or more of:

one or more test type constraints associated with at least the second type of conformance test, an amount of data to be transferred to the data conformance service in order to perform at least the second type of conformance test at the edge gateway, or available bandwidth between the data conformance service and the edge gateway.

18. The one or more storage media as recited in claim 15, wherein the program instructions when executed on or across the one or more processors further cause the one or more processors to:

receive, from the client, a selection of the information model of the machine from among a plurality of information models available at the data conformance service for selection, or receive, from the remote site of the client, the information model of the machine;

determine, based on the other information model, updated cloud test code to be executed by the data conformance service to perform at least the first type of conformance test for additional data from the machine and updated edge test code to be executed by the edge gateway to perform at least the second type of conformance test for the additional data from the machine, deploy the updated edge test code to the edge gateway.

19. The one or more storage media as recited in claim 15, wherein the program instructions when executed on or across the one or more processors further cause the one or more processors to:

determine, based on the cloud test results and the edge test results, at least one action to be performed by the machine; and send, to the remote site, an indication of the at least one action to be performed by the machine.

20. The one or more storage media as recited in claim 15, wherein to determine the cloud test code to be executed by the data conformance service and the edge test code to be executed by the edge gateway, the program instructions when executed on or across the one or more processors further cause the one or more processors to:

receive, from the client, input indicating at least one parameter value for at least the first type of conformance test and at least one parameter value for the at least the second type of conformance test.

* * * * *